United States Patent Office 3,342,794
Patented Sept. 19, 1967

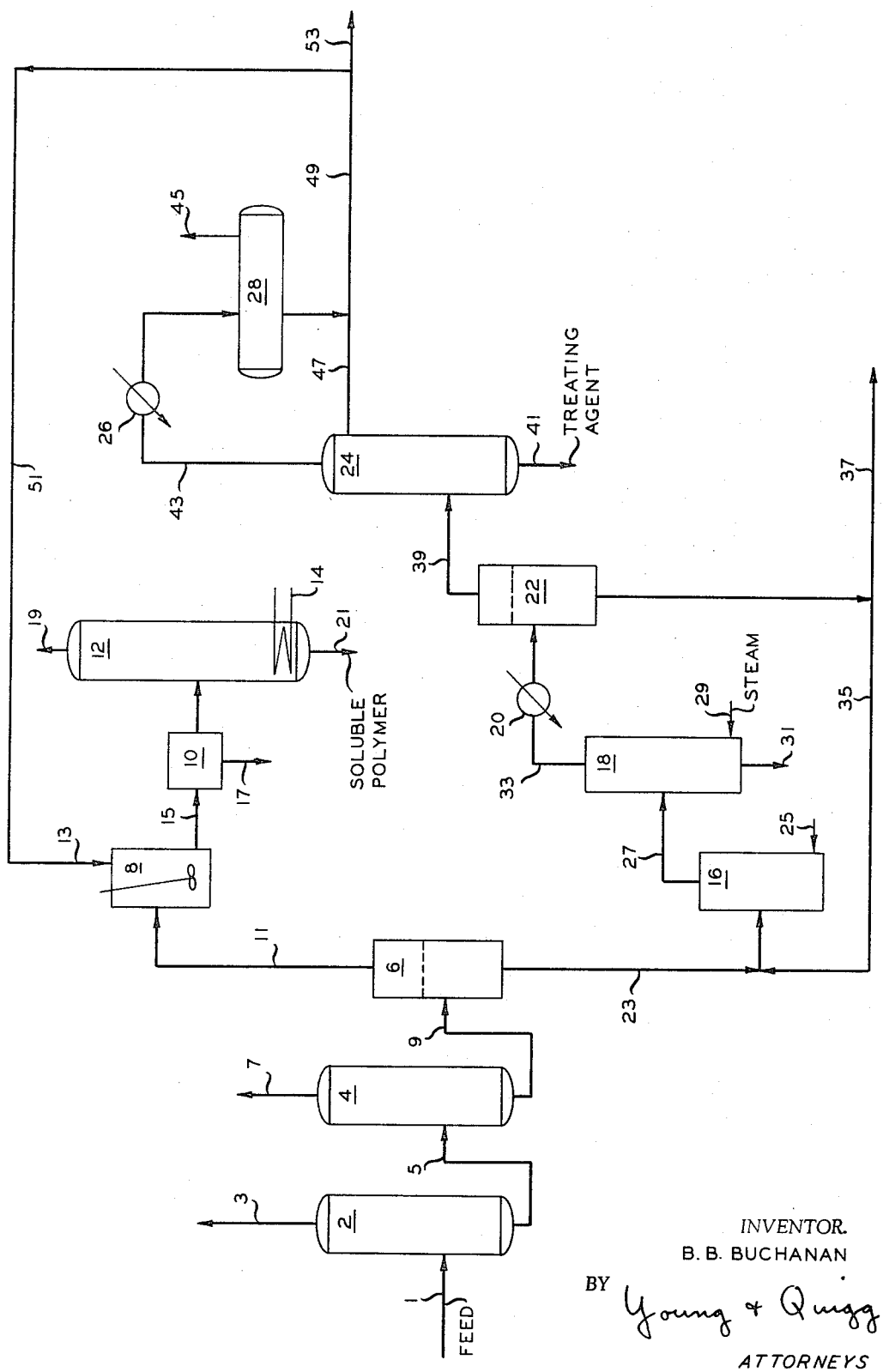

3,342,794
POLYMERIZATION REACTION CLEANUP
Ben B. Buchanan, Bartlesville, Okla., assignor to Phillips Petroleum Company, a corporation of Delaware
Filed Dec. 20, 1963, Ser. No. 332,090
6 Claims. (Cl. 260—93.7)

This invention relates to cleanup of reaction mediums. In one aspect this invention relates to recovery of soluble polymers. In another aspect this invention relates to recovery of reaction medium treating agents. In another aspect this invention relates to improved process and apparatus for recovery of valuable constituents from reaction waste streams.

Various reactions for polymerizing olefins are known which are carried out in the presence of catalysts. Generally these reactions are also conducted in liquid phase with a solvent employed as a diluent and the polymers are recovered after being precipitated from the reaction medium. A major problem encountered with the preparation of polymers is the presence of catalyst residues, or ash-forming ingredients associated with the polymer product. The "ash content" of a polymer is the inorganic constituents (catalyst residues) which produce ash when the polymer is burned. The catalyst residues retained in the polymers adversely affect the color, heat stability and electrical properties of the product. Another problem associated with polymerization processes is the loss of polymer which does not precipitate out of solution and is called soluble polymer.

Several treating methods have been practiced for the removal of catalyst residues from polymer. Particularly effective treating agents for removing catalyst contamination are chelating agents such as dicarbonyl compounds containing the group

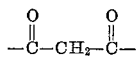

such as acetylacetone and the like. When a halogen is in the catalyst complex, an alkylene oxide having 2 to 8 carbon atoms can be employed with a dicarbonyl compound to assist the dicarbonyl chelator.

In the past, after the addition of a dicarbonyl compound to the reaction medium to dissolve the catalyst residue, precipitation and removal of the solid polymer and solvent removal, the remaining material has been contacted with water at a high temperature to break the dicarbonyl compound-catalyst complex and steam stripped to remove waste material. Water is phase-separated from the resulting hydrocarbon stream and the hydrocarbon phase is fractionally distilled to recover the dicarbonyl compound and hydrocarbon.

I have now discovered that the chelating agent and soluble polymer can be more efficiently and economically recovered by separating the stream into two phases, one containing soluble polymer and the other soluble catalyst, prior to further recovery steps.

Accordingly, an object of my invention is to provide an improved process and apparatus for separating polymerization reaction mediums. It is another object of my invention to provide an economical and efficient process for recovery of soluble polymer and treating agents from reaction medium residues.

Other objects, aspects and advantages of my invention will be apparent to those skilled in the art upon further study of this disclosure, the drawing and appended claims.

In accordance with my invention, a fluid stream containing soluble polymer and a soluble dicarbonyl-catalyst complex is separated into a first and second phase, one phase containing the polymer and the other containing the catalyst complex. The polymer phase is contacted with solvent and the polymer and solvent are separated by contact with heat. The complex phase is contacted with hot water and the dicarbonyl compound is separated from the water and catalyst residue by contact with heat.

This invention is applicable to the treatment of polymers prepared by the use of catalyst compositions comprising at least one component having at least one halogen atom attached to a metal atom. Such catalyst compositions often include two or more components, one of which is a compound of a metal selected from Groups IV, V, VI and VIII of the Periodic Table according to Mendeleef, the second component being selected from organometal compounds, metal hydrides and metals of Groups I, II and III of the Periodic Table. Numerous examples of these catalyst compositions are well known in the art.

Examples of the second-mentioned component which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, methylaluminum dichloride, dimethylaluminum chloride, ethylaluminum dichloride, diethylaluminum chloride, di-n-butylaluminum bromide, isooctylaluminum diiodide, di-n-propylgallium fluoride, eicosylgallium dibromide, ditetradecylgallium fluoride, dicyclohexylgallium chloride, diphenylgallium bromide, diphenylindium chloride, dioctylindium fluoride, cyclohexylindium dibromide, 3-methylcyclohexylaluminum dichloride, 2-cyclohexylethylgallium dichloride, p-tolylberyllium iodide, di(3-phenyl-1-methylpropyl)indium fluoride, 2-(3-isopropylcyclohexyl)ethylthallium dibromide, and the like.

The metal hydrides can include, as specific examples, aluminum hydride, lithium aluminum hydride, barium hydride, gallium hydride, indium hydride, sodium aluminum hydride, potassium beryllium hydride, and the like.

The metals of the first, second and third groups are applicable as a class, the most important members being sodium, magnesium and aluminum.

The compounds of a metal of Groups IV, V, VI and VIII of the Periodic System include the oxides, hydrides, halides, oxyhalides and salts of organic acids, usually having twenty or less carbon atoms—such at formic acid, caproic acid, myristic acid, stearic acid, arachidic acid, and the like— of the said groups of metals, such as titanium, zirconium, chromium, thorium, molybdenum, vanadium, and the like.

A third catalyst component which can be used advantageously is an organic halide or organometal halide where the organic radical has thirty or less carbon atoms, and is advantageously an alkyl, cycloalkyl or aryl group. Specific examples are ethyl bromide, ethyl trichloro titanium, 1-bromobenzene, cyclohexyl chloride. Also applicable are an alkali metal or ammonium halide, an aluminum halide (where the catalyst also includes another metal compound such as titanium compound), a halogen, a hydrogen halide, a complex hydride, a mixture of an organic halide and a metal, and Grignard reagent.

A still more specific subgroup of catalysts with which excellent color and low ash content are obtained by the practice of the invention include catalysts where an organometal compound is used in combination with a metal salt. The ratios of the catalyst compounds can vary widely, depending upon the particular charge used and operating conditions, say from 0.02 to 50 mols of the first component per mol of the second catalyst component. If a third component is present, the amount can vary from 0.02 to 50 mols per mol of the second component.

The dicarbonyl compounds applicable to this invention are those materials containing the group:

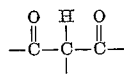

Such materials are those selected from the group consisting of (a) compounds of the general formula:

(a) 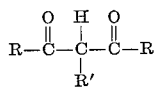

and (b) compounds of the general formula:

(b) 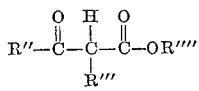

In compound (a), each R can be an alkyl, cycloalkyl, aryl, aralkyl, alkaryl, alkylcycloalkyl, or cycloalkylalkyl group or the R's can be joined to form a cyclic structure and R' can be hydrogen or an alkyl, cycloalkyl, aryl, alkaryl, aralkyl, alkylcycloalkyl, cycloalkylalkyl group, the number of carbon atoms in each R and R' being from 1 to 8.

In compound (b), R'' is an alkyl, cycloalkyl, aryl, aralkyl, alkaryl, alkylcycloalkyl, cycloalkylalkyl group or an OR'''' group; R''' is hydrogen or a hydrocarbon group as defined for R''; and R'''' is a hydrocarbon group as defined for R'', the number of carbon atoms in R'', R''' and R'''' being from 1 to 8.

Typical of such compounds are 2,4-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
2,2-dimethyl-3,5-nonanedione,
1-cyclohexyl-1,3-butanedione,
5,5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
1-phenyl-3-benzyl-9,11-nonanedione,
8,10-heptadecanedione,
8-ethyl-7,9-heptadecanedione,
6-octyl-5,7-undecanedione,
4-phenyl-3,5-heptanedione,
1,3-cyclohexanedione,
ethyl acetoacetate,
methyl acetoacetate,
n-propyl acetoacetate,
isopropyl acetoacetate,
tert-butyl acetoacetate,
diethyl malonate,
dimethyl malonate,
di-n-propyl malonate,
diisopropyl malonate,
di-tert-butyl malonate,
octyl acetoacetate,
heptyl acetoacetate,
phenyl acetoacetate,
diphenyl malonate,
dicyclohexyl malonate,
dicyclohexyl octyl malonate,
dihexyl phenyl malonate,
ethyl 3-oxopentanoate,
octyl 3-oxoundecanoate,
methyl 3-oxo-4-phenylbutanoate,
ethyl 3-oxo-5-phenylpentanoate,
octyl 3-oxo-2-phenylundecanoate,
octyl 3-oxo-2-octylundecanoate,
cyclohexyl 3-oxo-6-cyclopentylhexanoate,
and the like.

Alkylene oxides can be used as adjuvants for removal of catalyst from polymers of 1-olefin compounds containing from 2 to 8 carbon atoms. Such oxides will have in their molecular structure at least one oxirane group having the structure

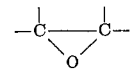

These compounds can be represented by the general formula:

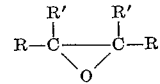

in which each R and each R' can be a hydrogen atom, an alkyl, cycloalkyl, or aryl group, or an epoxy-containing cyclic or alicyclic hydrocarbon group; and in which the R groups can be joined to form a carbocyclic group.

Typical compounds of this type include:

epoxyethane,
1,2-epoxypropane,
1,2-epoxybutane,
2,3-epoxybutane,
1,2:3,4-diepoxybutane,
1,2:4,5-diepoxypentane,
1,2:4,5:7,8-triepoxyoctane,
2,3-epoxy-2,3-dimethylbutane,
2,3-epoxy-2-methyl-3-ethylpentane,
epoxyethylbenzene,
epoxyethylcyclohexane,
epoxyethyl-3,4-epoxycyclohexane,
1,2-epoxycyclohexane,
2,3-epoxyethylcyclohexane,
1,2-epoxycyclopentane, and the like.

In one instance, propylene is polymerized in a mass polymerization operation in the presence of hydrogen, and a catalyst consisting of diethyl aluminum chloride and the reaction product of titanium tetrachloride and aluminum having the approximate formula $AlCl_3 \cdot 3TiCl_3$. Said reaction product comprises, in one instance, 4.74 weight percent aluminum, 25.0 weight percent titanium, and 69.8 weight percent chlorine. In this polymerization operation a purified feed stream of liquid propylene containing a small amount of free hydrogen and said reaction product are introduced into a loop reactor. The diethylaluminum chloride is separately introduced into the reactor. This reactor is typically operated at a temperature of about 130° F. and at a pressure of about 400 p.s.i.a. (pounds per square inch absolute). This temperature is maintained in the loop reactor by circulating water through heat exchange jackets with which the loop reactor is provided. Residence time of the reactant materials in the reactor is about three hours. An effluent stream containing solid polymer in particle form, liquid propylene containing soluble polymer, and catalyst residues is removed from the loop reactor. This effluent stream contains about 30 to 35 weight percent solid polymer. On occasions, this effluent stream contains as high as 40 weight percent solid polypropylene, and about 3.7 weight percent of soluble polymer.

The effluent stream from the reactor is passed into a contact tank, into which acetylacetone and propylene oxide are added. In this tank, the solid polymer is brought into intimate contact with the acetylacetone and propylene oxide at a temperature of from 100 to 145° F. and a pressure of 400 p.s.i.a., to maintain the unreacted propylene in the liquid phase. Following a 30-minute contact the treated effluent stream is then passed into a wash tank in which it is contacted in countercurrent flow with liquid propylene. About 4 pounds of liquid propylene per pound of polymer is employed as the wash liquid. Washed polymer as a 50 weight percent slurry of solid polymer in liquid propylene is withdrawn from the bottom of the wash tank and is passed to subsequent treatment for recovery of polymer.

A stream containing liquid propylene, catalyst residues, and soluble polymer is taken overhead from the wash tank and passed into a cyclone separator. Solid polymer inadvertently carried with this wash liquid is separated out in the cyclone and returned to the wash tank. Alternately, the overhead stream is filtered. This wash tank is maintained under a pressure of about 400 p.s.i.a.

The overflow washings from the wash tank, or cyclone separator, comprise propylene, chelated metals, excess chelating agent, soluble polymer and diluents, such as hydrogen. This stream constitutes the feed stream to a fractionation column. The purpose of this column is for separating as much light hydrocarbons and propylene as possible from the catalyst washings to minimize entrainment thereof in the concentrated soluble polymer and metal chelates, and also to facilitate the subsequent steam stripping of the dicarbonyl compounds from their chelates. The bottoms from this column are fed to the process of the invention.

My invention will now be described in detail with reference to the accompanying drawing which illustrates, in diagrammatic form, apparatus suitable for carrying out my invention as applied to the polymerization of propylene.

Referring now to the drawing, a stream containing propylene, soluble catalyst and soluble polymer is introduced to propylene cleanup column (fractionator) 2 through conduit 1. Propylene is removed as overhead from column 2 through conduit 3 and further processed for reuse in the process. The bottoms from column 2 is passed to flash tank 4 operating at about atmospheric pressure and 80° F. by conduit 5. Propylene, propane, and pentane are removed through conduit 7 for further processing and reuse. A stream of soluble polymer and soluble catalyst is removed as bottoms through conduit 9 and passed to phase separator 6 operating under similar conditions to tank 4. In separator 6, stream 9 separates into two phases, the top containing soluble polymer and the bottom containing the treating agent and metal chelates. The polymer phase is removed through conduit 11 and passed to mix zone 8 where it is intimately contacted with propylene from conduit 13. The mixture from mix zone 8 is passed to filter 10 by conduit 15 for removal of solid metal chelates and treating agent through conduit 17. Filtered stream 15 is passed to distillation zone 12 operating at about atmospheric pressure and 100° F. wherein heat is added by means 14 and hydrocarbon vapors are moved through conduit 19 and soluble polymer is recovered by conduit 21. The lower phase in separator 6 is passed to reactor 16 by conduit 23 where it is contacted with water added through conduit 25. The water added to reactor 16 serves to break up the treating agent-catalyst residue complex and the resulting mixture is passed to steam stripper 18 by conduit 27. Steam is added to stripper 18 through conduit 29. Waste material is removed from stripper 18 through conduit 31 and the overhead is removed by conduit 33, cooled by means 20 and introduced into phase separator 22. Water is removed from separator 22 through conduit 35 which can be recycled to conduit 23 for reuse in reactor 16 or removed from the system through conduit 37. The top phase in separator 22 containing treating agent and hydrocarbon is removed through conduit 39 and introduced to fractionator distillation zone 24. Treating agent is recovered from zone 24 as bottoms through conduit 41 for reuse in the process. Hydrocarbon removed overhead through conduit 43 is cooled by means 26 and passed to accumulator 28. Water is removed as a top layer in accumulator 28 by conduit 45. Liquid hydrocarbon removed from accumulator 28 is partially recycled to zone 24 through conduit 47 as reflux and the remainder is passed through conduits 49, 51 and 13 for recycle to mix zone 8 or withdrawn from the system through conduit 53 for further processing and reuse.

The following tabulation is a material balance, expressed in terms of pounds per stream day, of material in process in various parts illustrated in the drawing.

|  | Stream Number | | | | | | | | |
| --- | --- | --- | --- | --- | --- | --- | --- | --- | --- |
|  | 5 | 7 | 9 | 11 | 23 | 27 | 29 | 31 | 33 |
| Propylene | 70,550 | 70,550 | | | | | | | |
| Propane | 14,991 | 14,991 | | | | | | | |
| Pentane | 7,674 | | 7,674 | 1,758 | 5,916 | 5,916 | | | 5,916 |
| Oxygenated organics | 150 | | 150 | 75 | 75 | 75 | | | 75 |
| Acetyl acetone | 1,065 | | 1,065 | 88 | 977 | 2,199 | | 50 | 2,149 |
| Metal chelates | 1,182 | | 1,182 | 60 | 1,122 | | | | |
| Polymer | 10,342 | | 10,342 | 10,342 | | | | | |
| Water | | | | | | 460 | 817 | 130 | 1,147 |
| Total | 105,954 | 85,541 | 20,413 | 12,323 | 8,090 | 8,650 | 817 | 180 | 9,287 |

|  | Stream Number | | | | | | | | |
| --- | --- | --- | --- | --- | --- | --- | --- | --- | --- |
|  | 35 | 39 | 41 | 49 | 45 | 51 | 37 | 19 | 21 | 53 |
| Propylene | | | | | | | | | | |
| Propane | | | | | | | | | | |
| Pentane | | 5,916 | | 5,916 | | 4,158 | | 5,916 | | 1,758 |
| Oxygenated organics | | 75 | | | | | | 75 | | |
| Acetyl acetone | 100 | 1,949 | 1,949 | | | | 100 | | | |
| Metal chelates | | | | | | | | | | |
| Polymer | | | | | | | | | 10,342 | |
| Water | 460 | 125 | | | 125 | | 562 | | | |
| Total | 560 | 8,065 | 20,24 | 5,916 | 125 | 4,158 | 662 | 5,991 | 10,342 | 1,758 |

A complete description of the above-referred-to polymerization operation, addition of acetylacetone and propylene oxide for catalyst removal and of the washing operation is disclosed in copending application, Ser. No. 174,002, filed Feb. 19, 1962, now U.S. Patent 3,280,090. The mechanism involved in the treatment of polymerization reactor effluent for removal of catalyst is described in copending application Ser. No. 190,263, filed Apr. 26, 1962, now U.S. Pat. 3,219,647.

Although my invention has been described with particular emphasis on the polymerization of propylene, it is to be understood that the improvement I have discovered in recovering constituents from polymer recovery and cleanup system is equally applicable to other polymerization processes employing catalyst systems as well as other chemical reactions.

The phase separation I make of the process stream containing soluble polymer, soluble catalyst, solvent and treating agent may be made, as described, in a quiescent zone or equally as well by other phase-separating means, such as centrifuges and the like.

One skilled in the art will recognize reasonable variations and modifications from the foregoing disclosure, drawing and appended claims which will not depart from the spirit and scope of my invention.

That which is claimed is:

1. In a polymerization process wherein propylene monomer in the presence of hydrogen and a catalyst consisting of diethylaluminum chloride and the material produced by contacting titanium tetrachloride with aluminum is reacted to produce solid polypropylene, the reaction effluent is contacted with acetylacetone and propylene oxide and washed with liquid propylene, solid polypropylene is removed and the remaining residue stream containing propylene, a complex of said catalyst and acetyl acetone and soluble polymer is subjected to fractional distillation for removal of propylene; the improvement in the treating of the residue stream from said fractional distillation zone which comprises separating said stream into two phases, a first phase containing soluble polymer and propylene and a second phase containing said complex and propylene; contacting said first phase with propylene and subjecting the resulting mixture to a stripping operation wherein soluble polymer is recovered as a bottoms product; contacting said second phase with water at increased temperatures to regenerate said acetylacetone and subjecting the resulting mixture to increased temperatures to recover said acetylacetone.

2. A process for recovering valuable constituents from a mixture that contains (1) hydrocarbons, (2) polymer soluble in said hydrocarbons, (3) a chelating agent selected from the group consisting of (a)

and (b)
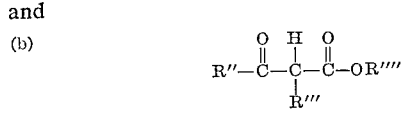

in which each R can be an alkyl, cycloalkyl, aryl, aralkyl, alkaryl, alkylcycloalkyl or cycloalkylalkyl group or can be joined to form a cyclic structure, R' can be hydrogen or an alkyl, cycloalkyl, aryl, alkaryl, aralkyl, alkylcycloalkyl or cycloalkylalkyl group, R" can be an alkyl, cycloalkyl, aryl, alkaryl, aralkyl, alkylcycloalkyl or cycloalkylalkyl group or an OR"" group, R"' is hydrogen or hydrocarbon group as defined for R", R"" is a hydrocarbon group as defined for R", the number of carbon atoms in each R, R', R", R"' and R"" being from 1 to 8, and (4) metal chelates of one of said chelating agents, which process comprises separating said mixture into two phases, the first of said phases containing major quantities of said polymer and the second of said phases containing major quantities of said chelating agent and metal chelates, each of said phases containing a portion of said hydrocarbons, subjecting said first phase to increased temperatures to separate soluble polymer therefrom, adding water to the second phase to decompose said metal chelates, and subjecting the resulting water treated second phase to increase temperatures to recover chelating agent therefrom.

3. The process of claim 2 wherein said mixture is passed to a quiescent zone to provide the separation into said two phases.

4. The process of claim 2 wherein said mixture is passed to a centrifuge to provide the separation into said two phases.

5. A process for recovering valuable constituents from a mixture that contains (1) hydrocarbons, (2) polymer soluble in said hydrocarbons, (3) a chelating agent selected from the group consisting of (a)

and (b)

in which each R can be an alkyl, cycloalkyl, aryl, aralkyl, alkaryl, alkylcycloalkyl or cycloalkylalkyl group or can be joined to form a cyclic structure, R' can be hydrogen or an alkyl, cycloalkyl, aryl, alkaryl, aralkyl, alkylcycloalkyl or cycloalkylalkyl group, R" can be an alkyl, cycloalkyl, aryl, alkaryl, aralkyl, alkylcycloalkyl or cycloalkylalkyl group or an OR"" group, R"' is hydrogen or hydrocarbon group as defined for R", R"" is a hydrocarbon group as defined for R", the number of carbon atoms in each R, R', R", R"' and R"" being from 1 to 8, and (4) metal chelates of one of said chelating agents, which process comprises separating said mixture into two phases, the first of said phases containing major quantities of said polymer and the second of said phases containing major quantities of said chelating agent and metal chelates, each of said phases containing a portion of said hydrocarbons, contacting said first phase with a light hydrocarbon and passing same to a stripping zone to remove hydrocarbon from the soluble polymer, contacting said second phase with water and passing same to a stripping zone wherein said second phase is contacted with steam, passing an overhead stream from said stripping zone through a cooling zone into a phase separation zone, passing the lighter phase from said phase separation zone to a fractionation zone, and withdrawing chelating agent as a bottom product from said fractionation zone.

6. The process of claim 5, wherein hydrocarbon removed as an overhead stream from said fractionation zone is employed as light hydrocarbon to contact said first phase.

No references cited.

JOSEPH L. SCHOFER, *Primary Examiner.*

F. L. DENSON, M. B. KURTZMAN,
*Assistant Examiners.*